J. MAGEE.
BLOWER FOR WATER TUBE BOILERS.
APPLICATION FILED FEB. 20, 1915.
1,162,089.
Patented Nov. 30, 1915.
3 SHEETS—SHEET 1.
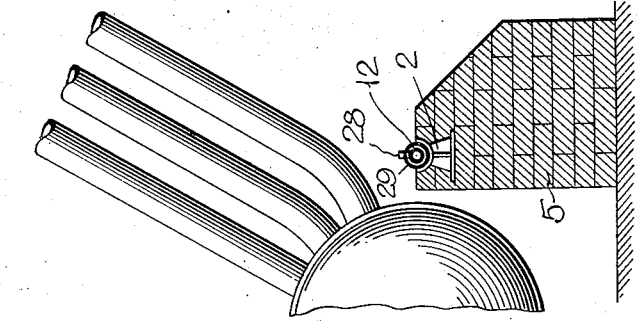
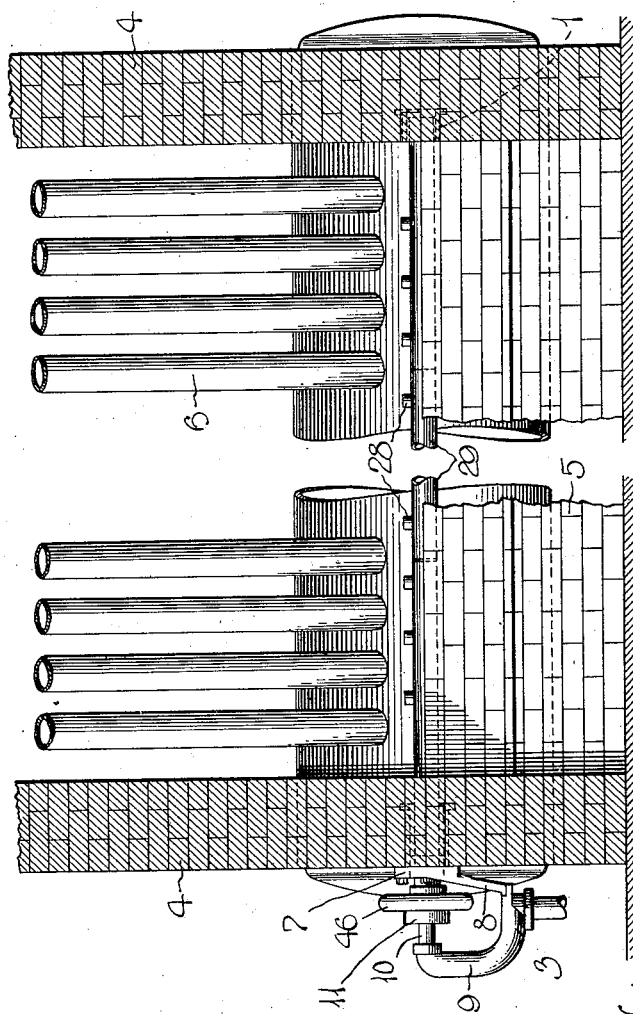

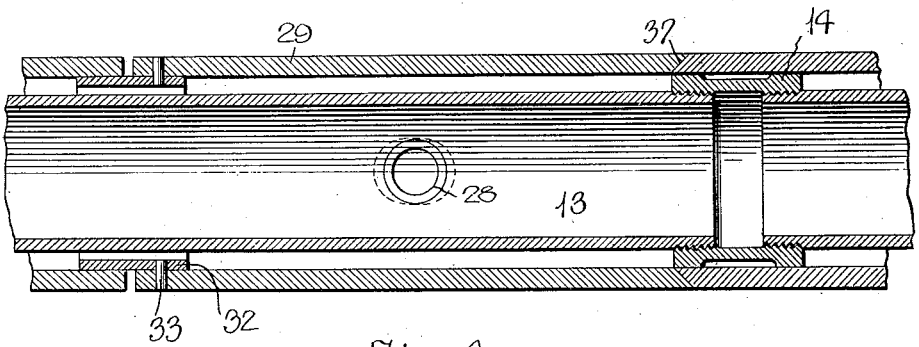
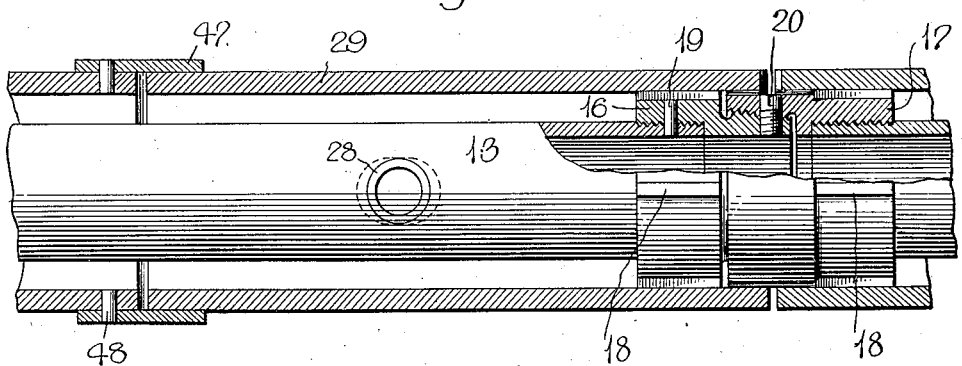
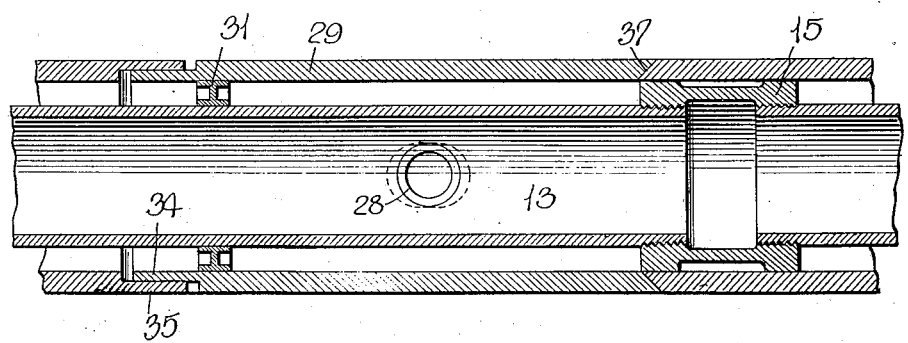

UNITED STATES PATENT OFFICE.

JOHN MAGEE, OF DETROIT, MICHIGAN, ASSIGNOR TO DIAMOND POWER SPECIALTY COMPANY, OF DETROIT, MICHIGAN, A CORPORATION OF MICHIGAN.

BLOWER FOR WATER-TUBE BOILERS.

1,162,089.  Specification of Letters Patent.  Patented Nov. 30, 1915.

Application filed February 20, 1915. Serial No. 9,529.

*To all whom it may concern:*

Be it known that I, JOHN MAGEE, a citizen of the United States of America, residing at Detroit, in the county of Wayne and State of Michigan, have invented certain new and useful Improvements in Blowers for Water-Tube Boilers, of which the following is a specification, reference being had therein to the accompanying drawings.

In the installation of blowers for water tube boilers, of the type wherein a tube or supply pipe is provided with a plurality of lateral jet nozzles or jet openings, it is frequently necessary to install such pipes in places of considerable heat. It is also frequently desirable to place such a pipe in a boiler in which the space between the walls through which the pipe is thrust and a companion boiler setting or building wall is so narrow that a pipe of any length cannot be readily installed.

This invention relates to a blower for water tube boilers in which provision is made for protecting the pipe from the effects of heat without subjecting it to the racking which would otherwise occur from expansion or contraction, or unequal movements between the interior members of the pipe and the exterior members; together with an arrangement whereby the pipe may be readily installed in sections, that is, built up and assembled on the spot; together with other features whereby the range of movement of the pipe on its axis may be adjusted to meet desired conditions of service.

The invention consists in the matters hereinafter set forth, and particularly pointed out in the appended claims.

Figure 8:
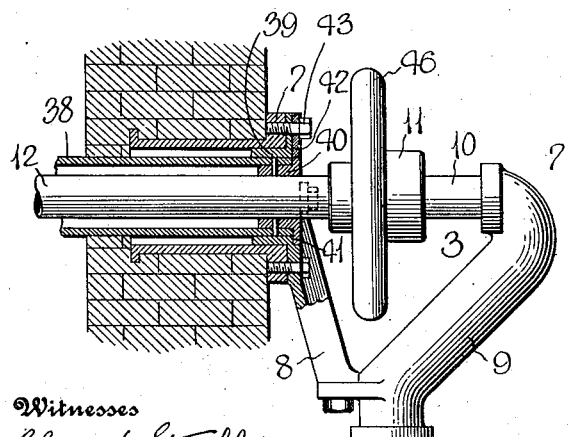
Figure 9:
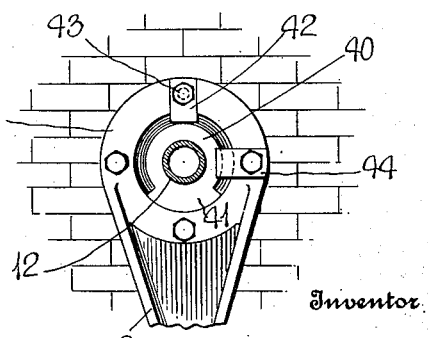

In the drawings, Figure 1 is a view in section through the lower portion of a water tube boiler of standard type showing a bridge wall and a blower mounted on the bridge wall that embodies features of the invention; Fig. 2 is a fragmentary view in side elevation of the bridge wall blower and adjacent water tubes; Figs. 3, 4, 5, 6 and 7 are views in detail showing various means for interconnecting the parts of the pipe to prevent disruption from unequal expansion and contraction; Fig. 8 is a view in detail of a supply fitting; and Fig. 9 is a view in detail showing a stop for limiting the angular movement of the pipe.

Referring to the drawings, a suitable inner end bearing 1, intermediate bearing or bearings 2 and supply fitting and bracket 3 are mounted on the side walls 4 and bridge wall 5 of a boiler having water tubes 6 disposed in the customary manner. A housing 7 of the fitting 3 is embedded in an opening through one of the side walls adjacent the bridge and a bracket 8 depending therefrom supports a tubular member 9 that is arranged to be connected to a pipeline from a suitable source of steam or air under pressure, usually the steam from the boiler itself being available. A tubular arm 10 of the member 9 is connected as by a suitable swivel joint indicated generally at 11, of standard construction, with a jet pipe 12 that extends through the housing 7. The sections 13 of which this pipe is formed, are connected at their ends by suitable couplings which may be either of standard type as indicated at 14 and 15, Figs. 3 and 5 or of special type.

As indicated in Fig. 4 for example, the couplings may consist of oppositely disposed members 16 and 17 that are counterbored and interiorly screwthreaded to receive the pipe section ends which are oppositely flanged and correspondingly fitted to be screwed together. For ease of manipulation and for acting also as centering members, the parts 16 and 17 may be provided with longitudinal flanges 18. After adjustment a pin 19 and locking screw 20 may be used to prevent accidental displacement.

Figure 6:
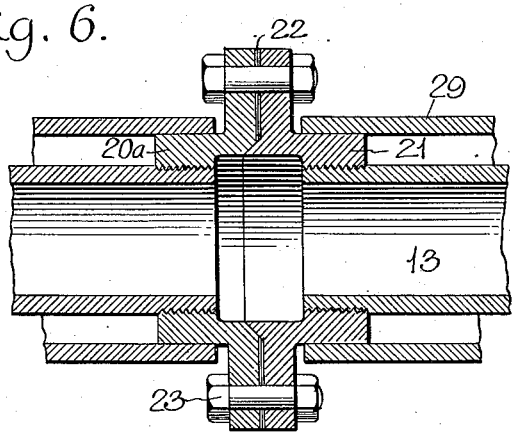

As indicated in Fig. 6, the pipe couplings may consist of oppositely disposed flange plates 20ª and 21 with interposed packing gaskets 22 and flange bolts 23 for drawing the parts together.

Figure 7:
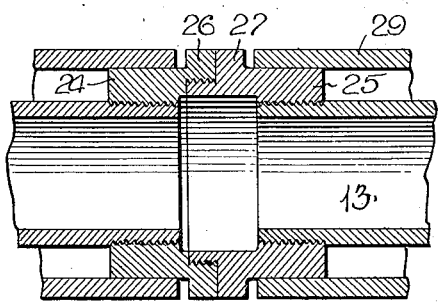

As indicated in Fig. 7, the couplings may consist of interiorly screwthreaded parts 24, 25 engaged by the pipe end and screwed together with abutting shoulder flanges 26 and 27.

A plurality of jet nozzles 28 extend from the several sections of the pipe so as to project jets of steam or air against and between the water tubes 6, the nozzles being spaced to most effectively clean the particular boiler to which the blower is applied, the conditions varying not only with the position of the blower in the boiler, as it may be mounted in any natural space or convenient pass, but also upon the spacing of the water tubes and the disposition of the adjacent interior surfaces, baffle faces or the like which it is desired to clean.

The nozzles are inserted through apertures slightly larger than the bodies of the nozzles, formed in a casing built up of sections 29 that are concentrically secured around the pipe sections 13. The casing sections are arranged in staggered relation, preferably, to the pipe sections so that the joints that connect the ends of the sections lie between the pipe couplings. The coupling members of the pipe sections act as spacers to retain the parts in concentric relation although additional members, such as indicated at 31 in Fig. 5, may be used if desired.

Various forms of expansion joint couplings may be used to loosely connect the casing sections so as to allow free longitudinal expansion and contraction of the latter regardless of the corresponding action of the pipe sections. As indicated in Fig. 3 a sleeve 32 secured as by a pin 33 in one of the sections may telescopically engage into the corresponding section. Or the sleeve may be exteriorly placed as indicated at 47 and 48 in Fig. 4. In Fig. 5, one of the casing sections is turned down to form a reduced portion 34 over which a counterbored end portion 35 of the companion casing section is free to move longitudinally. The nozzles 28 or other means may be used to prevent shifting of the casing longitudinally of the pipe, and as such anchoring means is between the ends of the section of the casing, the sections are free to expand and contract on the pipe sections without disturbing the joints of the latter.

As indicated in Figs. 3 and 5 the sections of the casing may be two part with beveled connections as indicated at 37.

An end section of the casing indicated at 38, Fig. 8, is journaled in a bushing 39 inserted in the housing 7. A flanged plug 40 filling the annular space between the adjacent pipe 12 and the casing 38, has a flange indicated at 41 that is segmental. A stop 42 secured by one of the assembly bolts 43 or other suitable means to the housing lies in the path of rotation of the flange and acts as a stop to define the limit of angular motion of the casing and pipe. A keeper 44 may be applied to prevent accidental longitudinal displacement of the parts. A hand wheel 46, sprocket wheel or the like may be applied for convenient manipulation of the pipe.

While shown herein as applied directly to a bridge wall, a pipe of this type may also be used in any pass or natural space of a water tube boiler whereby it may be rotated or oscillated so that the jets effectively clean the interior surfaces of the boiler within range thereof. In such instance the supporting member 2 that is peculiarly applicable to bridge walls or the like may be also placed on a baffle or may be arranged to be secured to a water tube, drum, stay bolt or other interior member of the boiler so as to provide support for the jet pipes between the ends thereof. Obviously there may be instances where it is inconvenient to support the inner ends of the jet pipes in the setting of the boiler and in such instance it may not extend entirely across the pass, the member 2 or a sufficient number thereof being used to provide the necessary support. It is to be understood that the annular spaces between the pipe sections and casing sections are packed with non-conducting material, such as mineral wool, asbestos or the like, such filling being omitted from the drawing for clearness of illustration. As a result of the built up construction of the pipe, it may be assembled section by section and thrust through one of the setting walls and housing, being added to until it has been brought to the proper dimensions, the casing also being applied as the pipe is built up.

Because of the establishment of the expansion joints between the pipe couplings, and the anchoring of the casing sections between the ends thereof, the latter are free to give and take under the effects of the high heat to which they may be subjected without reference to the movement from expansion of the pipe which is usually under considerably less heat and subjected to less fluctuations in temperature.

Obviously, changes in the details of construction may be made without departing from the spirit of my invention and I do not care to limit myself to any particular form or arrangement of parts.

What I claim is:—

1. A blower comprising detachably connected pipe sections having lateral jet producing means, a supply fitting to which the pipe sections are rotatably secured, casing sections encircling the pipe and likewise rotatably engaging the fitting, means for limiting the angular movement of the casing and pipe on the fitting, expansion joints between the casing sections in staggered relation to the connected pipe section ends, and means between the extension joints for anchoring the casing sections to the pipe sections.

2. A blower comprising a supply fitting having a housing connected by a bracket to a tubular arm in alinement with an opening through the housing, a swivel joint mounted on the tubular arm, detachably connected pipe sections having lateral jet producing means, the end section thereof extending through the housing and engaging in the swiveled joint, casing sections on the pipe, the end section being rotatably engaged in the housing, a stop in the housing limiting the angular movement of the casing section, expansion joints in the casing in staggered relation to the connected pipe section ends, and means anchoring the casing sections to the pipe sections between the expansion joints.

3. A blower comprising detachably connected pipe sections having lateral jet producing means, a supply fitting to which an end section is rotatably secured, casing sections on the pipe of which an end section is rotatably engaged in the fitting, a stop on the fitting limiting the angular movement of the casing and pipe therein, expansion joints in staggered relation to the connected pipe section ends, that couple the casing sections and means anchoring the casing sections to the pipe sections between the expansion joints.

4. In a blower, a rotatable pipe, a housing adapted to be mounted in the boiler setting opening, a bracket secured on the housing in which the rotatable pipe is journaled, a tubular member supported on the bracket and provided with a tubular arm in axial alinement with the pipe, a swiveled joint between the arm and the pipe, and means for limiting the angular movement of the pipe in the housing and bracket.

5. In a blower for boilers, a housing adapted to be mounted in an opening in a boiler setting, a bearing bracket mounted on the housing and setting from which it extends, a jet pipe extending through the housing and rotatively engaging in the bracket, a tubular member secured on the bracket provided with an inturned arm in axial alinement with the pipe, means rotatably connecting the pipe and arm, a segmental flange on the pipe adjacent the bracket and a stop on the bracket in the path of rotation of the segmental flange for limiting the angular movement of the pipe.

In testimony whereof I affix my signature in presence of two witnesses.

JOHN MAGEE.

Witnesses:
ANNA M. DORR,
CHAS. W. STAUFFIGER.